United States Patent
Hofmann et al.

(10) Patent No.: US 10,919,539 B2
(45) Date of Patent: Feb. 16, 2021

(54) METHOD FOR OPERATING A VEHICLE CONTROL SYSTEM

(71) Applicant: Robert Bosch GmbH, Stuttgart (DE)

(72) Inventors: Konrad Hofmann, Ilsfeld (DE); Charlotte Grinenval, Markgroeningen (DE); Stefan Wickert, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 58 days.

(21) Appl. No.: 16/307,308

(22) PCT Filed: Apr. 7, 2017

(86) PCT No.: PCT/EP2017/058401
§ 371 (c)(1),
(2) Date: Dec. 5, 2018

(87) PCT Pub. No.: WO2017/215808
PCT Pub. Date: Dec. 21, 2017

(65) Prior Publication Data
US 2019/0135301 A1 May 9, 2019

(30) Foreign Application Priority Data
Jun. 13, 2016 (DE) .......................... 102016210382.2

(51) Int. Cl.
*B60W 50/029* (2012.01)
*B60K 28/10* (2006.01)

(52) U.S. Cl.
CPC .......... *B60W 50/029* (2013.01); *B60K 28/10* (2013.01); *B60T 2270/402* (2013.01); *B60T 2270/413* (2013.01); *B60W 2050/0292* (2013.01)

(58) Field of Classification Search
CPC ........ B60W 50/029; B60W 2050/0292; B60K 28/10; B60T 2270/402; B60T 2270/413; B60T 8/267; B60T 8/1755; B60T 8/344; B60T 13/686; B60T 13/165; B60T 13/662; B60T 8/4081; B62D 5/0409; B62D 1/166
See application file for complete search history.

(56) References Cited

U.S. PATENT DOCUMENTS 3,482,486 A 12/1969 Nordholm
6,591,705 B1 7/2003 Reik et al.
(Continued)

FOREIGN PATENT DOCUMENTS

EP 1026060 A2 8/2000
EP 3000673 A1 * 3/2016 ............ B60T 8/1755
(Continued)

OTHER PUBLICATIONS

International Search Report for PCT/EP2017/058401, dated Jul. 12, 2017.

*Primary Examiner* — Anne Marie Antonucci
*Assistant Examiner* — Andrew J Cromer
(74) *Attorney, Agent, or Firm* — Norton Rose Fulbright Us LLP; Gerard Messina

(57) ABSTRACT

In a method for operating a vehicle control system having at least two actuators acting upon a vehicle state variable, a first actuator is initially activated, and at a time interval prior to arrival at a boundary condition regarding the first actuator, a switchover is made to a second actuator.

13 Claims, 2 Drawing Sheets

(56) References Cited

U.S. PATENT DOCUMENTS

| | | | | |
|---|---|---|---|---|
| 2004/0239180 A1* | 12/2004 | Foust | .................... | B60T 8/1755 |
| | | | | 303/152 |
| 2006/0081800 A1* | 4/2006 | Riester | .................... | F16K 31/05 |
| | | | | 251/129.01 |
| 2009/0195058 A1 | 8/2009 | Jackson et al. | | |
| 2012/0319462 A1* | 12/2012 | Akita | .................... | B60T 8/4081 |
| | | | | 303/2 |
| 2014/0190761 A1* | 7/2014 | Reimann | ............. | B62D 5/0409 |
| | | | | 180/444 |

FOREIGN PATENT DOCUMENTS

| | | | |
|---|---|---|---|
| EP | 3000673 | A1 | 3/2016 |
| WO | 2015008590 | A1 | 1/2015 |

\* cited by examiner

METHOD FOR OPERATING A VEHICLE CONTROL SYSTEM

FIELD OF THE INVENTION

The present invention relates to a method for operating a vehicle control system in a vehicle having at least two actuators, which act upon the same driving state variable.

BACKGROUND INFORMATION

Vehicle control systems are known, which control the interaction of different actuators in the vehicle that influence the same driving state variable. For example, hybrid vehicles having an electric drive motor and an internal combustion engine are known; either only the electric drive motor, the drive motor together with the internal combustion engine, or only the internal combustion engine being active as a function of different parameters and state variables. In such hybrid vehicles, it is also known that during braking operation, the electric drive motor may be used as a generator in regeneration mode, in order to recharge the vehicle battery. The regeneration is carried out in response to a braking request by the driver; the hydraulic vehicle brake being able to be additionally activated, in order to attain a requested setpoint deceleration. As soon as the vehicle battery has attained a certain state of charge, a switchover is made to the hydraulic vehicle brake as the only braking device.

SUMMARY

The method of the present invention relates to operation of a vehicle control system including at least two actuators acting upon a common driving state variable or vehicle state variable. The actuators may be operated alternately, the operation being focused on limiting boundary conditions. In some instances, the different actuators may also be operated simultaneously; the weighting of the actuators, which act together upon the same driving state variable, being preferably adjustable, which means that the contribution of each actuator may be set variably for attaining the driving state variable.

At least one actuator is subject to a limiting boundary condition, which differs from the driving state variable that is controllable via activation of the actuator. The boundary condition limits, for example, the operability of the actuator, the full operability being ensured, as long as the boundary condition has not yet been reached. However, upon reaching the boundary condition, the operability of the actuator in question is not ensured or at least no longer completely ensured.

In the method of the present invention, the time of arrival at the limiting boundary condition is ascertained, in particular, from a state variable or parameter of the actuator or of a unit assigned to the actuator. This state variable or parameter, which is ascertained, e.g., sensorially or on the basis of a mathematical model, is monitored; the time of arrival at the limiting boundary condition being able to be deduced from the characteristic curve of the state variable or parameter.

A time span is calculated back from the time of arrival at the limiting boundary condition, the time span accordingly being situated at a time interval prior to the reaching of the boundary condition. At this time, a switchover is made from the first actuator to the second actuator. Therefore, the switchover is not made only upon arrival at the limiting boundary condition, but already at an earlier time, at which the operability of the first actuator is still ensured without limitation. An advantage of this procedure is that the transition from the first to the second actuator may be carried out without limitations, which means that, for example, with regard to ergonomic aspects, the transition may take place with as little effect as possible on the driving feel. Ideally, the switchover from the first to the second actuator is implemented in such a manner, that it is not noticed by the driver. Accordingly, the transition may be carried out under an additional condition, for example, at a constant driving state variable, which is influenced by the actuators, for example, at a constant vehicle speed or constant vehicle deceleration or acceleration. Thus, the transition between the actuators may be carried out smoothly and without being perceived by the driver.

With the aid of the method, control systems in vehicles may be operated, in which two or possibly more than two actuators act upon the same driving state variable. The actuators may belong to either the same module, for example, a brake system, or different modules, for example, the brake system and the drive system, as long as the present invention ensures that the actuators act upon the same driving state variable of the vehicle.

The driving state variable is, for example, a kinematic driving state variable, such as the vehicle speed or a vehicle acceleration in the longitudinal, transverse and/or vertical direction. The vehicle state variable also includes state variables, which influence the driving state of the vehicle indirectly, for example, the steering angle, the steering torque or the braking torque.

According to one advantageous variant, the time interval prior to the switchover between the actuators is designed in such a manner, that the switchover operation is concluded prior to arrival at the limiting boundary condition of the first actuator. In this manner, it is ensured that the full operability of each actuator also remains ensured during the switchover operation between the actuators. The first actuator would first arrive at its boundary condition limiting the operability, after conclusion of the switchover operation; however, at this time, the switchover operation has already ended, and the driving state variable is influenced by the further actuator(s).

According to another further, advantageous variant, the switchover operation between the actuators takes place continuously and in an overlapping manner. Accordingly, the switchover operation is not carried out abruptly, but on the contrary, the activity of the first actuator is continuously cut back, and at the same time, the activity of the second actuator is increased. In the overlap phase, the influence of the actuators on the vehicle state variable adds up; the two actuators remaining below their maximum working capacity, and in total, the influence on the vehicle state variable remains constant; for example, a constant braking torque is generated, which is on the same level as prior to the switchover operation. For example, the switchover operation is carried out in such a manner, that the vehicle state variable assumes the same, constant value prior to, during and after the switchover operation.

According to another further advantageous variant, in the initial state, prior to the execution of the switchover operation, only a subset of the actuators is active, which are deactivated after the conclusion of the switchover operation; one or more further actuators being active after the switchover operation. Consequently, it is a complete change of activity from one actuator to another actuator.

However, in one alternative variant, it is provided that both prior to the switchover operation and after the switchover operation, at least two actuators be active simultaneously, but that with the switchover, the weighting between the actuators be changed. An advantage of this variant is that the maintenance of the driving state variable is distributed over different actuators, only the state of activity between the actuators being changed at the switchover. During braking operation of a hybrid vehicle, it is possible, for example, prior to the switchover operation, to generate the greater portion of the requested braking power, using the electric drive motor in generator mode, and to generate the lesser portion, using the hydraulic vehicle brake, in order to carry out the regeneration; the conditions being reversed after the switchover operation.

According to one more further, advantageous variant, a plurality of actuators are active prior to the switchover operation and are relieved by one or more actuators after the switchover operation; in some instances, a modified weighting distribution also being considered.

According to a further advantageous variant, the method of the present invention is used during braking of the vehicle, in that different actuators influencing the braking action are controlled. In the hydraulic vehicle brake, a hydraulic pump, for example, an ESP (electronic stability program) pump is used, for example, as an actuator for generating braking force. The hydraulic pump may be controlled in different ways before, during and after the switchover operation.

An internal combustion engine in the vehicle, which generates drag torques in overrun mode, may also be used as a further actuator, which has an influence on the braking action of the vehicle and is able to generate a braking force. The internal combustion engine in overrun mode, the hydraulic vehicle brake and/or an electric drive motor in generator mode may each be used as an actuator, which generates braking force and has influence on the vehicle speed as a driving state variable; a switchover between these actuators being possible.

In order to prevent an excessively high brake temperature in the hydraulic vehicle brake, it may be useful, for example, at a time interval prior to reaching a critical brake temperature, to switch over from a mode including actuation of the hydraulic vehicle brake, to a mode including the internal combustion engine in overrun mode. In this context, the switchover operation is advantageously carried out continuously and in an overlapping manner, in order to prevent brake jerk during the switchover.

According to a further advantageous variant, the method is used for steering the vehicle; an electric servomotor for generating a steering torque being used as an actuator in the steering system. If the steering system is subjected to high mechanical loads, for example, due to repeated or long-lasting activation of the steering while the vehicle is stationary, or during off-road operation on pathless terrain, then, for example, the temperature in the electric servomotor may increase. Before this reaches a limiting temperature value, an additional actuator influencing the steering may be activated at a time interval prior to this. For example, the steering system may be assisted during the trip by unilateral braking actions in the vehicle, through which the loading for the electric servomotor is reduced.

The different method steps are executed and coordinated in a regulating and/or control unit, which generates actuating signals for controlling the actuators.

DETAILED DESCRIPTION

Figure 1:
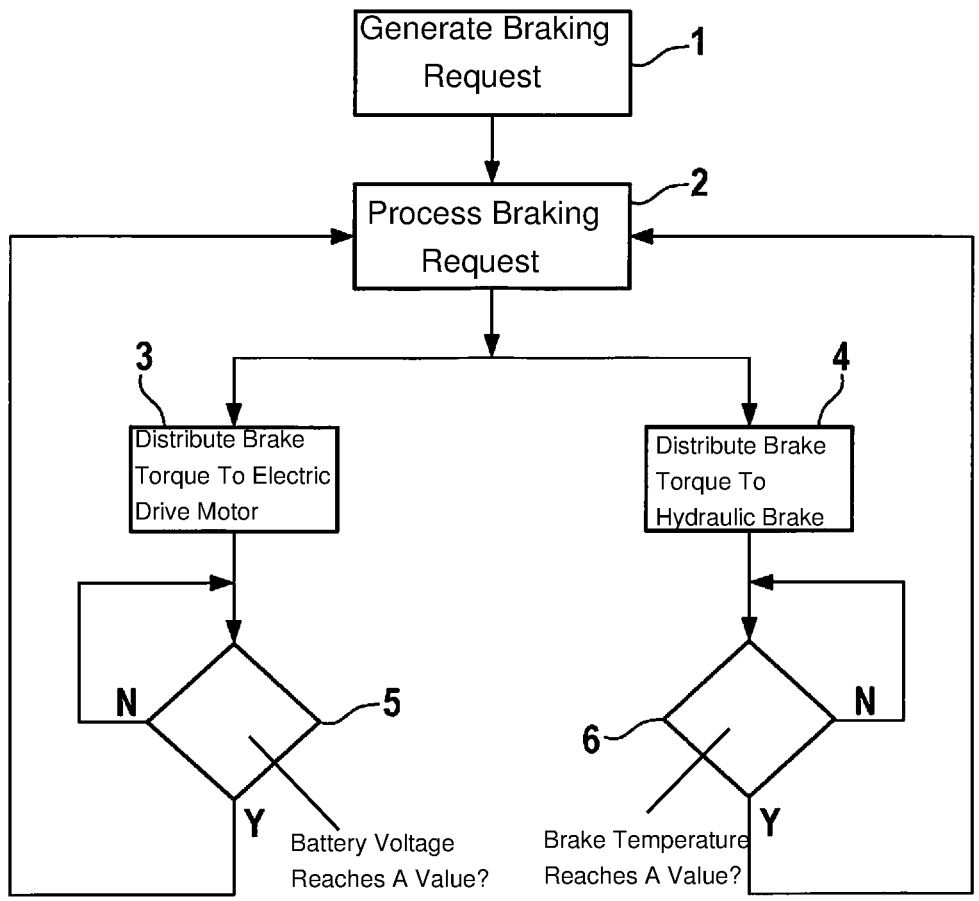
FIG. 1 is a flow chart including method steps for switching over, during braking operation, between an electric drive motor, which is used in generator mode, and a hydraulic vehicle brake.

In the flow chart according to FIG. 1, a driving situation in a vehicle during braking is represented. In method step 1, a driver's braking request is initially generated, in particular, by manipulating the brake pedal. In the next method step 2, the driver's braking request is processed in a regulating and/or control unit, in which actuating signals are generated for controlling actuators, by which the braking force to be generated may be influenced. It is, for example, an electric drive motor 3, which is operated in generator mode, as well as a hydraulic vehicle brake 4, which is equipped with an electrically controllable, hydraulic pump, for example, an ESP pump, for modulating the hydraulic brake pressure.

In step 2, the braking force to be generated, that is, the braking torque, is distributed, in the control unit, to electric drive motor 3 and hydraulic vehicle brake 4. In this context, boundary conditions may be taken into account both in electric drive motor 3 and in vehicle brake 4; in response to exceedance of limiting values, the boundary conditions resulting in functional impairment in the respective actuator.

In the initial state, a selected distribution between electric drive motor 3 and vehicle brake 4 is carried out. For regeneration, the vehicle is preferably braked via the generator mode of electric drive motor 3; vehicle brake 4 only being activated for the case, in which the requested brake torque may not be supplied exclusively via the generator mode.

In step 5, the voltage state of the vehicle battery, which is charged in the generator mode of electric drive motor 3, is monitored. At a maximum, the generator mode may be sustained until the battery is completely charged. The current state of charge in the vehicle battery is monitored; temporally prior to arrival at the maximum state of charge, which represents a limiting value, a switchover being made to the vehicle brake as the solely active actuator during the braking.

In the case of the present invention, the switchover takes place at a time interval prior to arrival at the maximum state of charge of the vehicle battery. In this connection, the time interval is proportionate, inter alia, to the duration of the switchover operation, which is preferably carried out continuously and uniformly, by continuously ramping down the braking activity of the electric drive motor, and at the same time, continuously ramping up the braking activity of the vehicle brake.

If the inquiry in step 5 reveals that the state of charge of the vehicle battery has reached a value, which is at a selected time interval prior to the maximum state of charge, then the Yes-branch ("Y") is returned to control unit 2, in which the switchover operation between electric drive motor 3 and vehicle brake 4 is initiated. However, if the inquiry in step 5 reveals that the state of charge will first be reached in a period of time, which is longer than the selected time interval, then the No-branch ("N") is returned again to the start of the inquiry according to step 5, and this is repeated in cyclical intervals.

In a step 6, the brake temperature, in particular, the brake disk temperature, may be monitored simultaneously in the vehicle brake. The brake temperature may not exceed a limiting value. In step 6, it is checked if the temperature approaches a value, which would reach the limiting temperature in the event of a further increase in a selected time interval. If this is not the case, then the No-branch is returned again to the start of the inquiry according to step 6, and this is run through repeatedly in cyclical intervals. However, if the selected time interval prior to arrival at the critical temperature is reached, then the Yes-branch is returned to step 2, and in the control unit, a new redistribution of the braking force to be generated is carried out by switching over between the actuators.

In principle, the chart shown in FIG. 1 is applicable to different vehicle control systems, which include at least two actuators, by which the same driving state variable may be influenced. In this case, they may be stability systems, for example, anti-roll stabilization systems in the vehicle, or steering systems.

Figure 2:
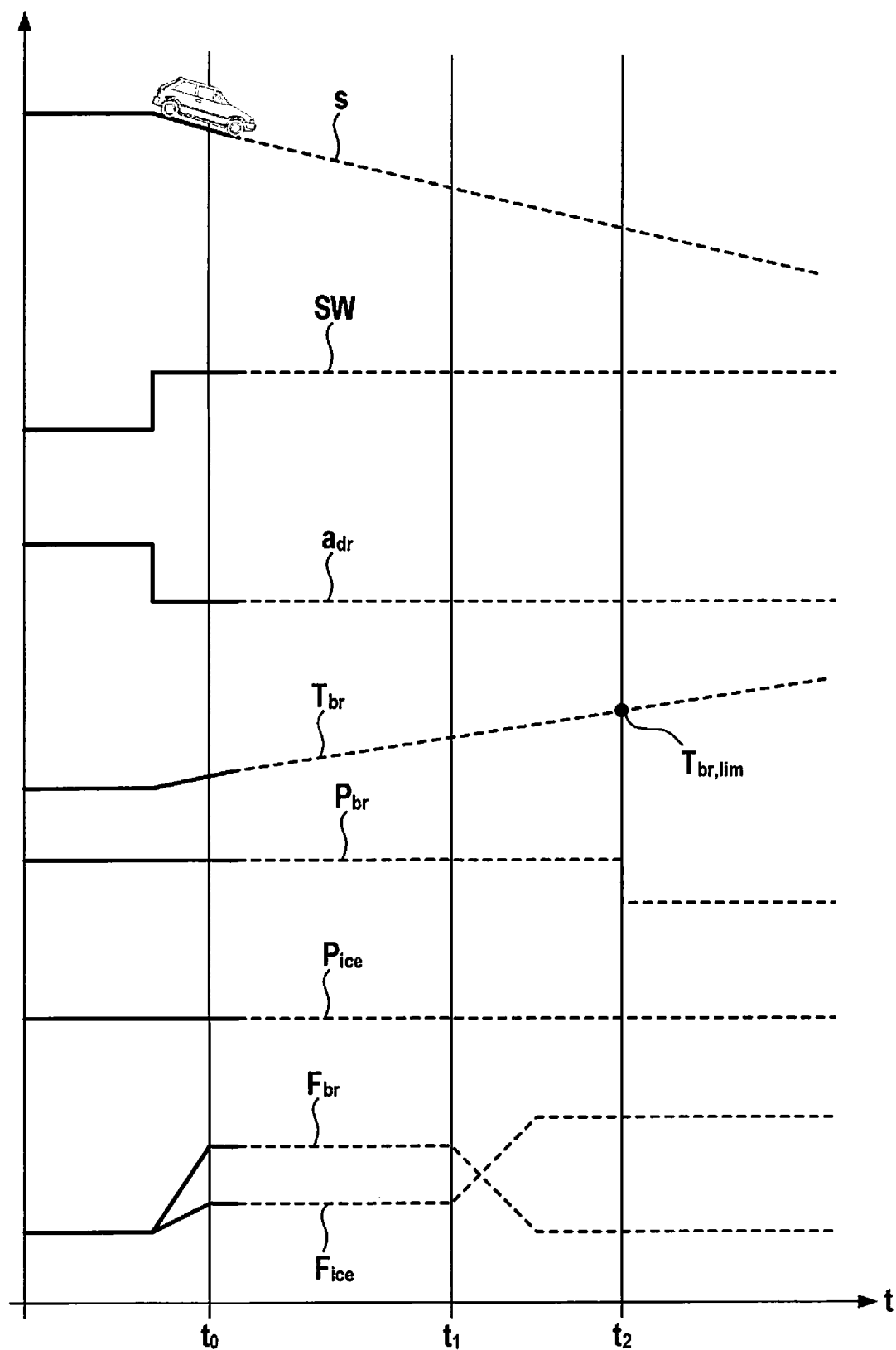
FIG. 2 is a timing diagram including the characteristic curve of different state variables and parameters in the vehicle, while braking with the aid of the hydraulic vehicle brake and an internal combustion engine, which is operated in overrun mode by drag torques.

The characteristic curve of different parameters during downhill travel of the vehicle, which is in braking operation, is depicted as a function of time in FIG. 2. Curve s at the top denotes the downhill travel of the vehicle depicted. The route is predictively known from data of a navigation system in the vehicle.

The driver inputs a deceleration request $a_{dr}$ by manipulating the brake pedal. In the exemplary embodiment, deceleration $a_{dr}$ shall be constant.

In a brake pedal switch SW, the braking request produces an increased, constant value, which reflects the driver's braking request $a_{dr}$, as well as the downhill travel, which is known from the data of the navigation system.

At time $t_0$, the vehicle is decelerated both by a braking force $F_{br}$ of the hydraulic vehicle brake and, on a lower braking force level, by a braking force $F_{ice}$ from an engine drag torque of the internal combustion engine, which is driven in overrun mode. This braking action lasts until time $t_1$.

During the operation of the hydraulic vehicle brake, brake temperature $T_{br}$ increases continuously. If the temperature of the vehicle brake reaches a limiting value $T_{br,lim}$, then the potential function of the vehicle brake $P_{br}$ falls abruptly to a value of zero, which means that no more braking force may be generated by the hydraulic vehicle brake.

Limiting temperature value $T_{br,lim}$ is reached at time $t_2$. By monitoring current brake temperature $T_{br}$, time $t_1$ may be identified in a selected time interval prior to this, at which the braking operation is switched over continuously to the internal combustion engine in overrun mode, in order to generate drag torques. At time $t_1$, the brake temperature is not yet in the critical range.

Accordingly, the time span between $t_1$ and $t_2$ for a continuous transition in the generation of braking force, including a reduction in braking force $F_{br}$ of the vehicle brake to a value of zero and a simultaneous increase in engine drag torque $F_{ice}$ to an increased value, is carried out, so that the desired braking force is attained. This is also valid for the transition of the hydraulic braking force in the time interval between $t_1$ and $t_2$, in which the hydraulic braking force is continuously reduced and the engine drag torque is continuously increased; the requested braking force is also produced during the transition, from the sum of the hydraulic braking force and engine drag torque.

As can be deduced from curve $P_{ice}$, which indicates the potential function of the engine drag torque, this remains constant over the entire time interval considered, which means that the engine drag torque is available in all of the situations considered.

What is claimed is:

1. A method for operating a vehicle control system including at least two actuators acting upon a driving state variable, the method comprising:
   initially activating, to influence the driving state variable, a first actuator of the at least two actuators; and
   performing, via an actuating signal of a regulating and control unit, a switchover to a second actuator of the at least two actuators at a time interval prior to arrival at a limiting boundary condition of the first actuator, wherein the limiting boundary condition differs from the driving state variable that is controllable via activation of the actuator;
   wherein in an initial state, a selected distribution is carried out between the at least two actuators,
   wherein the vehicle is a hybrid vehicle having an electric drive motor and an internal combustion engine and a hydraulic braking system, in which at least one of the at least two actuators is associated with the electric drive motor and another of the at least two actuators is associated with the internal combustion engine and a hydraulic braking system,
   wherein a weighting of the actuators, which act together upon a same driving state variable, is adjustable, so that a contribution of each actuator is settable variably for attaining the driving state variable,
   wherein a time of arrival at the limiting boundary condition is determined from a characteristic curve of the driving state variable, and
   wherein boundary conditions are taken into account in the electric drive motor and in the hydraulic braking system, in response to exceedance of limiting values, wherein the boundary conditions for the electric drive motor and the hydraulic braking system result in functional impairment of the actuators, and
   wherein a voltage state of a vehicle battery, which is charged in a generator mode of the electric drive motor is monitored, wherein the generator mode is sustained until the vehicle battery is charged, wherein a current state of the charge in the vehicle battery is monitored;
   temporally prior to arrival at a maximum state of charge, which represents a limiting value, a switchover being made to the vehicle brake as the solely active actuator during the braking.

2. The method as recited in claim 1, wherein the time interval prior to the switchover between the at least two actuators is such that the switchover is concluded prior to arrival at the boundary condition of the first actuator.

3. The method as recited in claim 1, wherein the switchover between the at least two actuators is carried out in a continuous and overlapping manner.

4. The method as recited in claim 1, wherein in an initial state, only a subset of the at least two actuators is active, the method further comprising:
   at the switchover, deactivating actuators of the subset, and activating an actuator that is not part of the subset.

5. The method as recited in claim 1, wherein in an initial state, at least two actuators of the at least two actuators are active simultaneously, the method further comprising:
   at the switchover, changing the weighting between the at least two actuators.

6. The method as recited in claim 1, wherein the method is used during braking of a vehicle.

7. The method as recited in claim 6, wherein at least one of the at least two actuators is used for generating a braking force and includes an electric drive motor in a vehicle, in a generator mode.

8. The method as recited in claim 6, wherein at least one of the at least two actuators is used for generating a braking force and includes a hydraulic pump in a hydraulic vehicle brake.

9. The method as recited in claim 6, wherein at least one of the at least two actuators includes an internal combustion engine in an overrun mode used for generating a drag torque.

10. The method as recited in claim 1, wherein the method is used during steering of a vehicle.

11. The method as recited in claim 10, wherein at least one of the at least two actuators includes an electric servomotor in a steering system of a vehicle that is used for generating a steering torque.

12. A vehicle control apparatus, comprising:
a vehicle control system, including at least two actuators acting upon a driving state variable;
wherein the vehicle control system is configured to perform the following:
  initially activating, to influence the driving state variable, a first actuator of the at least two actuators, and
  performing a switchover to a second actuator of the at least two actuators at a time interval prior to arrival at a limiting boundary condition of the first actuator, wherein the limiting boundary condition differs from the driving state variable that is controllable via activation of the actuator;
wherein between the actuators, the switchover is made via an actuating signal of a regulating and control unit,
wherein in an initial state, a selected distribution is carried out between the at least two actuators,
wherein the vehicle is a hybrid vehicle having an electric drive motor and an internal combustion engine, in which at least one of the at least two actuators is associated with the electric drive motor and another of the at least two actuators is associated with the internal combustion engine and a hydraulic braking system,
wherein a weighting of the actuators, which act together upon the same driving state variable, is adjustable, so that a contribution of each actuator is settable variably for attaining the driving state variable, and
wherein a time of arrival at the limiting boundary condition is determined from a characteristic curve of the driving state variable, and
wherein boundary conditions are taken into account in the electric drive motor and in the hydraulic braking system, in response to exceedance of limiting values, wherein the boundary conditions for the electric drive motor and the hydraulic braking system result in functional impairment of the actuators, and
wherein a voltage state of a vehicle battery, which is charged in a generator mode of the electric drive motor is monitored, wherein the generator mode is sustained until the vehicle battery is charged, wherein a current state of the charge in the vehicle battery is monitored; temporally prior to arrival at a maximum state of charge, which represents a limiting value, a switchover being made to the vehicle brake as the solely active actuator during the braking.

13. An apparatus for controlling adjustable components of a vehicle control system, comprising:
a regulating and control unit for operating a vehicle control system, which includes at least two actuators acting upon a driving state variable, wherein the vehicle control system is configured to perform the following:
  initially activating, to influence the driving state variable, a first actuator of the at least two actuators, and
  performing a switchover to a second actuator of the at least two actuators at a time interval prior to arrival at a limiting boundary condition of the first actuator, wherein the limiting boundary condition differs from the driving state variable that is controllable via activation of the actuator;
wherein the vehicle control system includes at least two actuators that act upon the driving state variable, and wherein between the actuators, the switchover is made via an actuating signal of the regulating and control unit,
wherein in an initial state, a selected distribution is carried out between the at least two actuators,
wherein the vehicle is a hybrid vehicle having an electric drive motor and an internal combustion engine, in which at least one of the at least two actuators is associated with the electric drive motor and another of the at least two actuators is associated with the internal combustion engine and a hydraulic braking system, and
wherein a weighting of the actuators, which act together upon a same driving state variable, is adjustable, so that a contribution of each actuator is settable variably for attaining the driving state variable, and
wherein a time of arrival at the limiting boundary condition is determined from a characteristic curve of the driving state variable, and
wherein boundary conditions are taken into account in the electric drive motor and in the hydraulic braking system, in response to exceedance of limiting values, wherein the boundary conditions for the electric drive motor and the hydraulic braking system result in functional impairment of the actuators, and
wherein a voltage state of a vehicle battery, which is charged in a generator mode of the electric drive motor is monitored, wherein the generator mode is sustained until the vehicle battery is charged, wherein a current state of the charge in the vehicle battery is monitored; temporally prior to arrival at a maximum state of charge, which represents a limiting value, a switchover being made to the vehicle brake as the solely active actuator during the braking.

* * * * *